Patented Feb. 1, 1927.

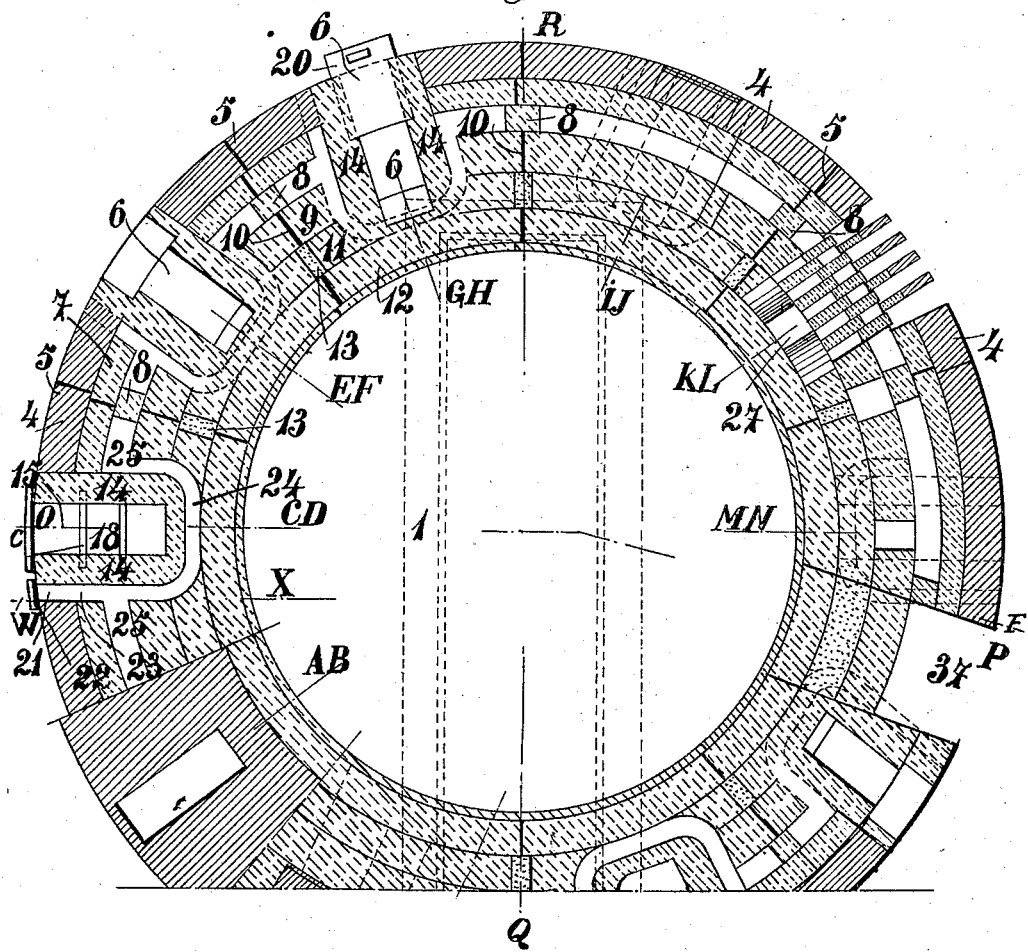

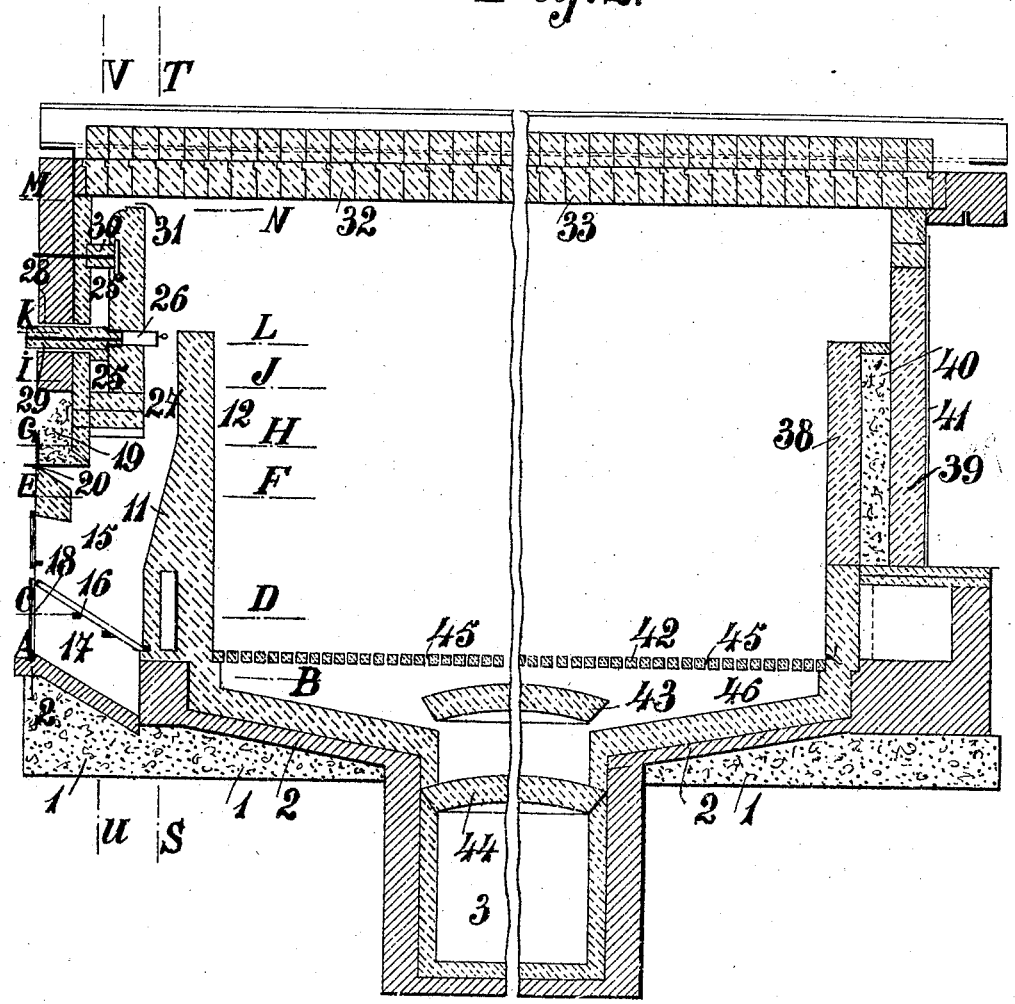

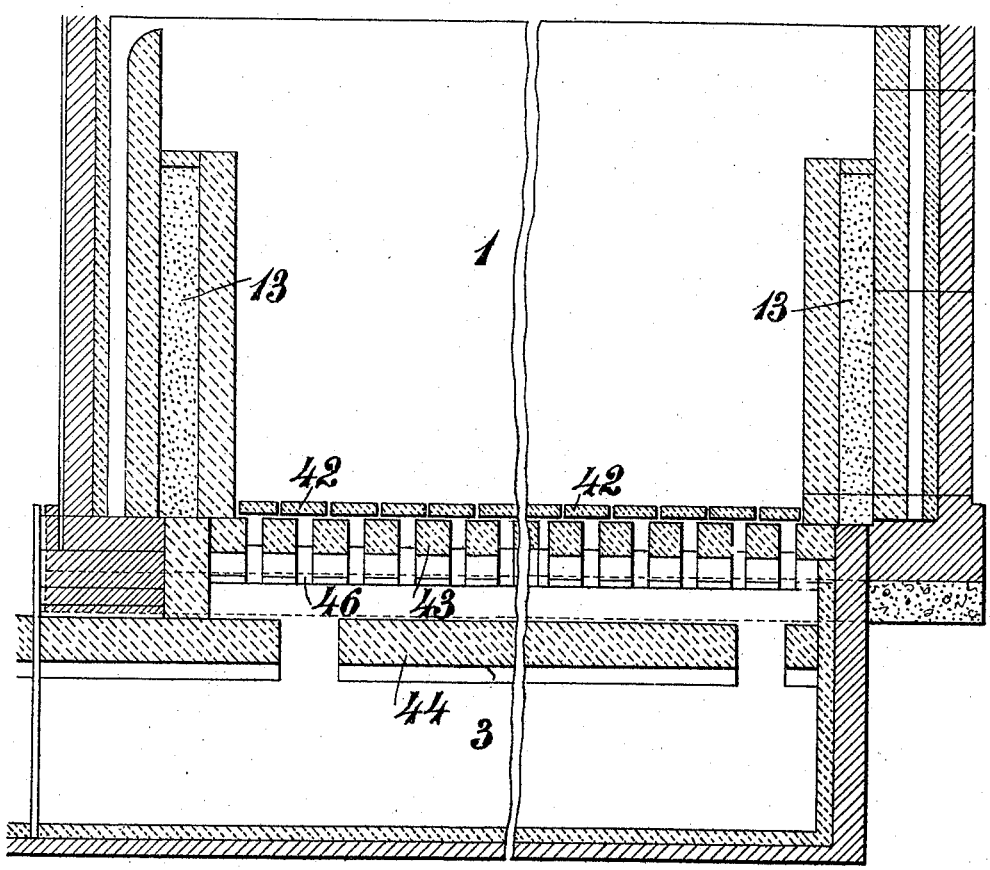

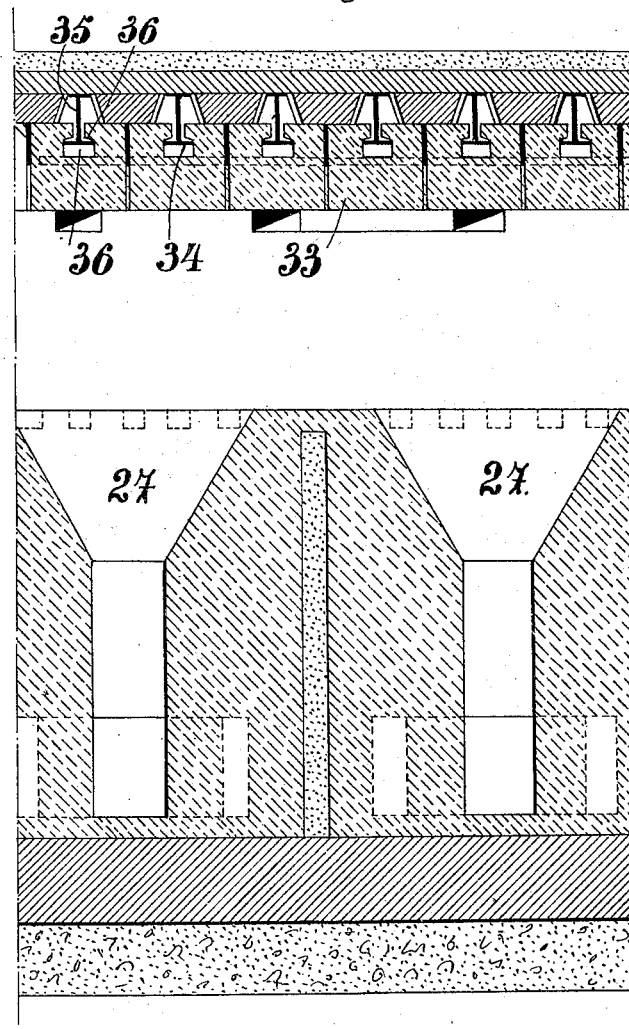

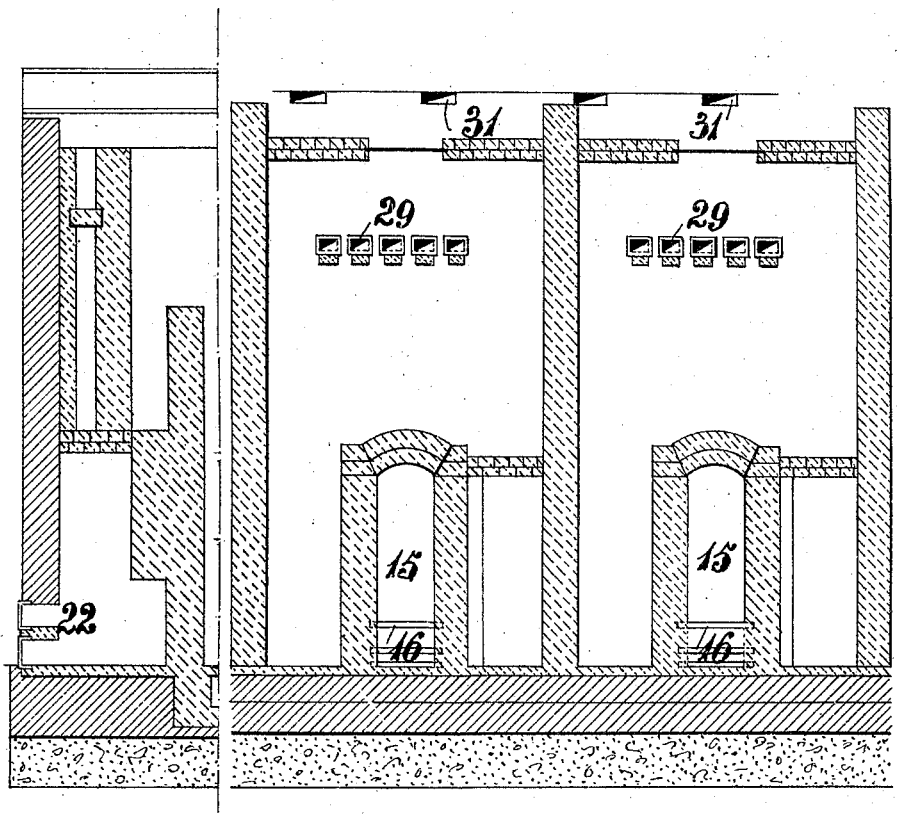

1,616,322

UNITED STATES PATENT OFFICE.

JULES LAURENT, OF MARCINELLE, CHARLEROI, BELGIUM.

VAULT FOR BAKING OVENS OR KILNS.

Application filed February 14, 1925, Serial No. 9,294, and in Belgium April 30, 1924. Renewed June 30, 1926.

This invention relates to vaults for baking ovens or kilns, combustion chambers, power generating plants, gas generators, etc. It provides for a plant that will be both simple and economical in its fuel consumption, at the same time improving the quality of the products derived from it, as a result of eliminating the refuse and freeing the product from the cracks caused by too sudden a cooling.

To that object, the present oven, which comprises a circular baking chamber made of brickwork with a fire-proof lining, having a number of peripheral furnaces, each of which works in conjunction with an inlet of secondary air fed through a passage surrounding the furnace inside the brickwork and provided with an adjustable admission register. The secondary air is led into an inter-space or air pillow formed between two thicknesses of fire-proof brickwork, said air pillow serving also to supply the secondary hot air in course of baking and to supply in the course of the cooling, i. e. at the beginning of the cooling operation, a current of air comparatively warm but gradually cooled in proportion as the contents of the kiln is getting cooled.

This arrangement permits of avoiding any contact between said cold air from outside and the products in the kiln, as also any cooling so sudden as to cause cracks in the products, and, consequently, a considerable amount of refuse stuff.

In the practical execution of the invention, the kiln will be closed at its upper part by a cover consisting of fire-proof bricks laid upon the lower parts of section-iron pieces transversely laid and leaning on the furnace walls without giving rise to oblique reactions, said bricks to be provided with circulating air ducts which ensure a suitable cooling of the vault or cover.

The accompanying drawing shows, by way of example, a kiln designed as per the invention, as applied to a factory of ceramic and fire-proof articles.

Fig. 1 is a horizontal section of a kiln comprising ten furnaces, this section being supposed to follow a line different for every furnace, in order to show the construction on different level planes; said section lines being indicated by A—B, C—D, E—F, G—H, I—J, K—L, M—N.

Fig. 2 is a vertical section along line C—F of Fig. 1.

Fig. 3 is a vertical section along line Q—R of Fig. 1;

Fig. 4 is a detail view corresponding to a section along line S—T, and Fig. 5 is a section view along line U—V of Fig. 2, after removal of the upper cover of the kiln.

Fig. 6 is a vertical section along line W—X of Fig. 1.

As illustrated in these views, the kiln has a bedding of concrete 1 whereupon a red brick lining 2 has been so placed as to form, in the central part and under the level of the kiln, a transverse passage 3 ending in the smoke pipe. A circular brickwork 4 installed upon the red bricks 2, is divided into segments separated by expansion joints 5 between two successive furnaces 6. Inside the brickwork 4 is a first fire-proof brickwork 7 which is separated, by pillars 8 situated between every two furnaces 6, from a second fire-proof brickwork 9 likewise divided into portions by expansion joints 10, and leaning its back against two layers of brickwork 11—12 provided with sand-filled joints 13. The brickwork 12, which is inside the oven, has a lower flange corresponding to the pavement. All of the furnaces 6 are located into the above mentioned layers of brickwork, at equal intervals and consist of fire-proof brickwork 14 comprising a combustion chamber 15 in the bottom of which is an inclined grate 16 forming an ash-box 17 with shutting register 18. As to the fuel, it is fed into the fire by means of a funnel 19, a plate 20 serving to withhold the fuel. On one side of the fire-proof brick-work forming the fire-place is an air inlet 21 with adjustable register 22. This air inlet communicates through passage 23 with a channel 24 surrounding the fire-proof brick-work 14 and ending into space 25 forming an air cushion between brickwork 7 and 9; this air cushion being divided into independent sections by means of pillars 8 standing between every two successive furnaces. The several air cushions so obtained pass above furnace 15

(see Fig. 1) and communicate, through an aperture 26, with passage 27 through which the gas of every furnace can reach the upper portion of the kiln, above brickwork 12 acting as a fire-bridge. In the air inlets 26 are fire-proof bricks 28 acting as so many registers and provided with a manhole 29 through which one can supervise the combustion process. Spaces 25 are, besides, provided, near their upper part, with an air-tight register 30 to be opened when setting to work by cooling, on the other hand, these passages 25 are connected through orifices 31 with the upper part of the kiln situated under the vault 32. As illustrated in the drawing, said vault is made of special fire-proof bricks 33 of the scarf-and-tongue type, passed on the lower parts 34 of section-iron pieces 35 so transversely laid above the kiln as to lean against the peripheral walls but free of any oblique reactions on these latter. Underneath the section-iron pieces 35, the bricks 33 are in the shape of ducts 36 having both ends open so as to permit the ambient air to circulate and so avoid too high a temperature of the vault. These ducts can, however, be connected with an air compresser serving to cause a compressed air circulation, if such is necessary, to obtain a sufficient cooling, in the case of a very high temperature of the vault; the end opposite that connected with the compresser could be connected either with the smoke pipe or with some channel as could permit utilizing the hot air, for example, for drying the raw products.

The material to be baked is let into the kiln through a wicket 37 arranged between two successive furnaces. After the kiln has been fed with material, that wicket will be stopped by a temporary brickwork 38, separated from a second wall, or outside wall 39, made after the same method, by means of a sand-filled joint 40 (see Fig. 2). That outside wall 39 can be covered with a sheet of paper 41 providing for air-tightness and preventing unfallibly any cold air from getting inside. The kiln hearth, whereupon the material comes to lie, is made of a pavement 42 laid upon small vaults and small walls 43 erected at intervals above the vault 44, to form part of the outlet duct 3 which ends into the smoke pipe. Between the fire-proof bricks 42 which constitute the kiln pavement are passages 45 through which the combustion stuff as also the hot gas can escape into the lower part of the kiln, where a number of small channels 46 are communicating with the chimney flue (Fig. 3).

The kiln as above described will act as follows:

The material to undergo the baking operation having been fed through interval 37, this latter being then closed as explained, one will kindle the fire in furnaces 15, and feed by means of the coal as indicated at 10. The combustion derivatives escaping through channels 27, will come across a secondary air current when reaching the upper part, prior to penetrating into the combustion chamber of the kiln, said secondary air current being warmed and let, through register 21, into the passage 25. This air, properly warmed as a result of its passing through flue 24 which surrounds the furnace, will arrive into space 25, and be spread above the furnace so as to get into channel 27 through apertures 26, for the registers 28 are open at that moment, while the registers 30 are closed. Combustion being thus completed, the hot gas will traverse the combustion chamber of the kiln downwards, the current being uniformly distributed owing to the subdivision which results from the great number of furnaces. After its passage through the products, the gas will pass, through apertures 45, into the lower chamber 46 of the kiln, and then will escape into the chimney pipe 3 placed underneath the segmented vault 44. In the course of work, the vault 32 is free of any damage owing to the air circulation through passages 36, due to which the cooling of the vault is ensured, at the same time those bricks 33 are prevented from getting mellow or from melting. As soon as the baking operation has been ended, one will shut the registers 29 in order to prevent hot air from getting through the orifices 26; on the other hand, registers 30 are to remain open, thus providing for the escape, through upper orifices 31, of the air let in through registers 21 and having passed through passages 23, 24 and 25. This air, being thus properly warmed at the cost of the warmth contained in the brickworks which surround the furnaces, will traverse the products the kiln contains, and cool them gradually, in proportion as the furnaces and the material lying on the bottom will get cooler. Therefore, any contact between cold air and the material getting cooled will be surely avoided; at the beginning, cooling takes place by means of comparatively hot air, the temperature of which is only lowered in a gradual way, in proportion as the baked material is itself getting cooler. Comparatively to the known methods, the present invention secures an important advantage in that the ceramic or fire-proof material thus obtained is free from cracks, with the result of greatly reducing the amount of refuse.

The invention is, of course, not restricted to the particular construction details shown and described, and modifications might be introduced not detrimental to the regular distribution of hot gas and of the air used for cooling.

It should be further noticed that the system set forth herein is to be applied not only to the ceramic or fire-proof article manufactories, but likewise to glass works kilns, metallurgical furnaces and appliances, reheating furnaces, gas generating plants, also to certain combustion chambers utilized in combination with any kind of motive power plant, say, for instance, boiler fires fed with coal dust: to be short, anywhere a part of the fire-proof lining (in most cases it will be the upper part or vault) has to undergo very high temperatures. It is known that these can cause the fireproof linings to become too tender, and liable to collapsing: an accident avoided owing to the air circulation passages which ensure proper cooling of said materials.

According to the use contemplated, said air passages can be traversed by ambient air either as an ordinary current or by forced draught, this latter being obtained either by suction or driving action, in order to obtain a more efficient cooling.

In certain cases, the air circulating through the passages hollowed out of the brickwork, can serve to the recovery of the warmth absorbed by the bricks, and be driven again through the kiln to serve as secondary air for the purpose of completing the combustion: a result obtainable no matter whether the bricks are or not of the scarf and tongue type and passed on joists laid transversely on the brickwork, as above indicated, and no matter which manner of fixation or assembling has been recurred to. Moreover, the air circulation inside the cooling channels can be regulated in any suitable way.

The main advantages secured by the use of this system may be summed up as follows:

1. Erection can be made by any professional men after one demonstrative running.
2. Considerable reduction of anchoring arrangements, which cannot be dispensed with when using other constructions.
3. Whilst being run, the kiln need not be supervised and this cannot be said of all other systems.
4. Laboratories can be restricted to the size exactly necessary.
5. Facility of choosing any shape whatever for the vault.
6. Longer duration, due to the absence of articles getting scaled off.
7. Facility for dismantling and erecting again with the same materials: that is to say, assuming the vault to be necessarily dismantled for any reason whatever, the initial materials thereof can be used again, subject to no waste.
8. The gas distribution being under control of the vault, the contents of the kiln can be heated up with the utmost regularity.
9. Considerable saving in gas, since the vault can be chosen of any form whatever.
10. Great saving in labor for its construction, and easy repair while the plant is being run, in case of any abnormal emergency.
11. Can be recurred to with the same advantages no matter which size the kilns may have: their length being quite at will, and their width being of 8 to 10 metres, even more.

Having now fully described my said invention, what I claim and desire to secure by Letters Patent, is:

1. A kiln comprising a circular-shaped brick work, a series of peripheral furnaces arranged about said brick work, the brick work being formed with passages to admit the heat of each of the furnaces to the interior of the circular-shaped brick work, and an air circulating passage for each furnace, said passage partly surrounding the furnace and extending into and forming a circular air cushion included within said circular brick work to provide an insulated layer of heated air about the circular brick work.

2. A kiln comprising a circular-shaped brick work, a series of peripheral furnaces arranged about said brick work, the brick work being formed with passages to admit the heat of each of the furnaces to the interior of the circular-shaped brick work, and an air circulating passage for each furnace, said passage partly surrounding the furnace and extending into and forming a circular air cushion included within said circular brick work to provide an insulated layer of heated air about the circular brick work, and means for controlling the admission of atmospheric air to said circulation passage.

3. In a kiln according to claim 1, including means for directing the air heated in said circulating passages to the top of the interior of the circular brick work.

4. A kiln comprising a circular brick work forming an interior receiving space, and an annular wall therefor, a series of independent furnaces arranged in said wall and substantially encircling the interior space, the wall intermediate the furnaces being formed with insulating spaces, and an air passage encircling each furnace and open at one end to the atmosphere and at the opposite end to the insulating space.

5. A kiln comprising a circular brick work forming an interior receiving space, and an annular wall therefor, a series of independent furnaces arranged in said wall and substantially encircling the interior space, the wall intermediate the furnaces being formed with insulating spaces, and an air passage encircling each furnace and open at one end to the atmosphere and at the opposite end to the insulating space, said insulating spaces being open to the interior space of the kiln at the upper end of the annular wall.

In testimony whereof I have hereunto set my hand.

J. LAURENT.